M. T. Kennedy,
Jointing Staves.
Nº 13,036. Patented June 12, 1855.
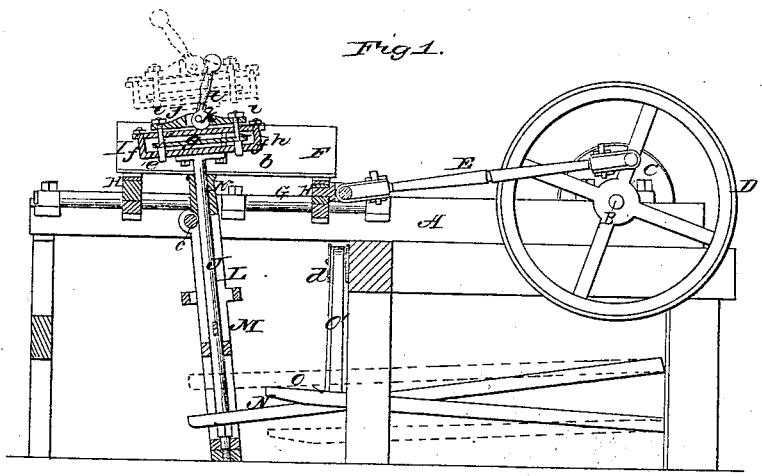
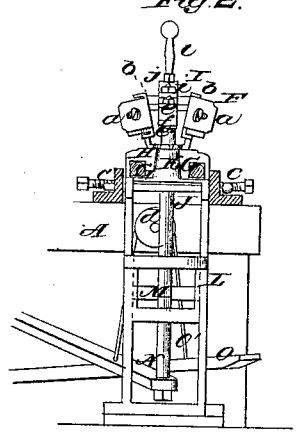
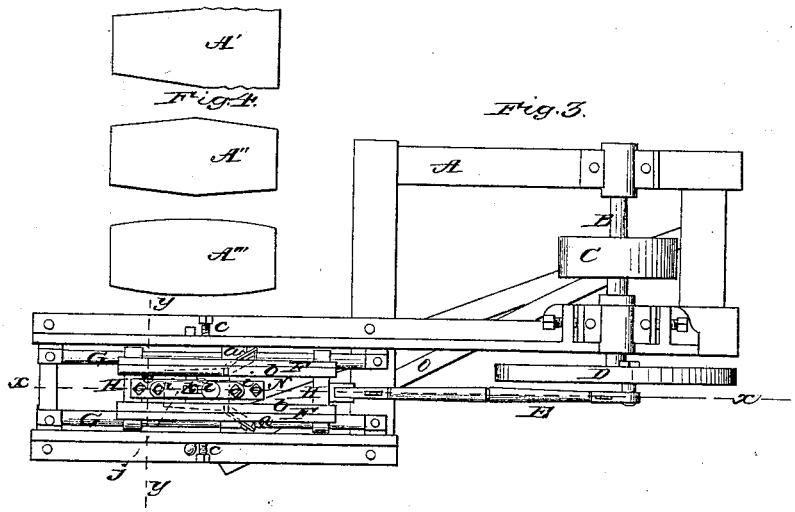

UNITED STATES PATENT OFFICE.

M. T. KENNEDY, OF FALLSTON, PENNSYLVANIA.

MACHINE FOR JOINTING STAVES.

Specification of Letters Patent No. 13,036, dated June 12, 1855.

*To all whom it may concern:*

Be it known that I, M. T. KENNEDY, of Fallston, in the county of Beaver and State of Pennsylvania, have invented a new and Improved Machine for Jointing Staves for Barrels, Kegs, &c.; and I do hereby declare that the following is a full, clear, and exact description of the same, reference being had to the annexed drawings, making a part of this specification, in which—

Figure 1, is a longitudinal vertical section of my improved machine, (*x*) (*x*) Fig. 3, shows the plane of section. Fig. 2, is a transverse vertical section of ditto (*y*) (*y*) Fig. 3, shows the plane of section. Fig. 3, is a plan or top view of ditto. Fig. 4, shows 3 staves, two finished, and one partly finished.

Similar letters of reference indicate corresponding parts in the several figures.

The nature of my invention consists in the combination of two reciprocating planers and an adjustable clamp, constructed, arranged and operated as will be hereafter shown and described, for the purpose of jointing staves for barrels, kegs, etc.

To enable others skilled in the art to make and use my invention I will proceed to describe its construction and operation.

A represents the frame of the machine constructed in any proper manner to support the working parts.

B, Figs. 1 and 3 is a shaft running in suitable bearings on the back part of the frame A. On this shaft B, there is a driving pulley C having a fly wheel D at one end. To the fly wheel D there is attached one end of a connecting rod E, the rod being attached some distance from the center of the wheel as shown clearly in Fig. 1. The opposite end of this rod E is attached to two reciprocating planers F F which work upon guides or ways G G on the front part of the frame A. The planers F F are formed by inserting cutters (*a*) (*a*) in metallic plates (*b*) (*b*), the plates (*b*) being a suitable distance apart and their upper edges inclined outward as shown in Fig. 2. The ends of the plates are attached to blocks or heads H, H, which work on the guides or ways G.

I represents a clamp which is attached to the upper end of a rod J. This rod J passes through a socket K in the upper part of a frame L which is secured or attached by pivots (*c*) (*c*) to the frame A, the lower end of the frame L being secured to the base or platform of the frame A. The rod J has a small cross bar M passing through it the ends of the cross bar working in guides or grooves in the sides of the frame, as clearly shown in Fig. 2. The lower ends of the rod J rest upon the ends of a treadle N which is connected to another treadle O by a strap O' which passes over a pulley (*d*) attached to the frame, see Figs. 1 and 2.

The clamp I is formed of two metallic plates (*e*) (*e*) connected by end pieces (*f*) (*f*), more particularly shown in Fig. 1. Between the two plates (*e*) (*e*) there is placed a plate (*g*) which has a bolt (*h*) at each end. These bolts pass through the upper plate (*e*) and have nuts (*i*) upon them. A plate (*j*) is also placed on the bolts (*h*) above the upper plate (*e*), the nuts (*i*) being above the plate (*j*) and a cam (*k*) is inserted in the plate (*j*), the cam being provided with a handle (*l*). The edge of the cam (*k*) bears upon the surface of the upper plate (*e*).

Operation: The staves to be jointed are secured in the clamp I by placing them one at a time between the upper plate (*e*) and the plate (*g*) and then by moving or turning the cam (*k*) the stave is secured firmly between the two plates above named. The lower end of the frame L is then moved toward the back part of the frame A so as to give the clamp I an inclined position as clearly shown in Fig. 1. Motion is then given the shaft B in any proper manner and the clamp by its own gravity settles down between the two planers F F and the edges of the stave are brought in contact with the cutters (*a*) (*a*) which have a reciprocating motion in consequence of the connecting rod E being attached to the end of the planers F F and the edges of the stave are planed or cut, and the stave also cut of taper form as shown at A' in Fig. 4. The foot is then pressed upon the treadle O and the clamp is elevated above the planes and the position of the stave reversed by turning the clamp half way around. The clamp is then allowed again to descend and the opposite end of the stave is cut in a similar manner. The stave is now of the form shown at A'' Fig. 4. And if the staves require to have rounded edges as shown at A''', Fig. 4, the staves are bent or spring upward at their centers in the clamp I. More or less taper may be given the staves by adjusting the frame L so that the clamp I may be more or less inclined. Some kinds of staves those used for pails, kegs, &c. require one taper only and of course those are not reversed in the clamps.

The above machine is extremely simple, operates well, and is not liable to get out of repair, nor expensive to manufacture.

I do not claim separately the reciprocating planers, for they have been previously used, but What I do claim as new and desire to secure by Letters Patent, is—

The combination of the reciprocating planers F F and clamp I, constructed arranged and operated in the manner and for the purpose as herein shown and described.

M. T. KENNEDY.

Witnesses:
DAVID STEWART,
JOHN ALLISON.